(12) United States Patent
Al-Khayat et al.

(10) Patent No.: US 7,274,547 B2
(45) Date of Patent: Sep. 25, 2007

(54) ELECTRICAL POWER SUPPLY SYSTEM AND A PERMANENT MAGNET GENERATOR FOR SUCH A SYSTEM

(75) Inventors: Nazar Al-Khayat, Leicestershire (GB); Wlodzimierz Koczara, Warsaw (PL); Artur Krasnodobski, Lincolnshire (GB)

(73) Assignee: Cummins Generator Technologies Limited, Lincolnshire (GB)

( * ) Notice: Subject to any disclaimer, the term of this patent is extended or adjusted under 35 U.S.C. 154(b) by 51 days.

(21) Appl. No.: 10/556,202

(22) PCT Filed: May 13, 2004

(86) PCT No.: PCT/GB2004/002062

§ 371 (c)(1),
(2), (4) Date: Nov. 9, 2005

(87) PCT Pub. No.: WO2004/102785

PCT Pub. Date: Nov. 25, 2004

(65) Prior Publication Data

US 2007/0008741 A1 Jan. 11, 2007

(30) Foreign Application Priority Data

May 13, 2003 (GB) ................... 0311013.7

(51) Int. Cl.
*H02H 7/26* (2006.01)
*H02M 5/458* (2006.01)

(52) U.S. Cl. ............................. 361/93; 361/87; 307/98; 363/56.03; 363/37

(58) Field of Classification Search .................. 361/87, 361/93; 307/98, 99; 363/56.02, 56.03, 37, 363/34, 132

See application file for complete search history.

(56) References Cited

U.S. PATENT DOCUMENTS

| | | | | |
|---|---|---|---|---|
| 3,735,243 A | * | 5/1973 | Downs et al. | 323/341 |
| 4,725,916 A | * | 2/1988 | Oshikiri | 361/104 |
| 4,959,602 A | * | 9/1990 | Scott et al. | 318/803 |
| 5,376,828 A | | 12/1994 | Kim et al. | 307/64 |
| 6,295,215 B1 | | 9/2001 | Faria et al. | 363/37 |
| 6,633,475 B2 | | 10/2003 | Thiele | 361/104 |
| 7,105,952 B2 | * | 9/2006 | Divan et al. | 307/98 |
| 2003/0043521 A1 | | 3/2003 | Thiele | 361/104 |

FOREIGN PATENT DOCUMENTS

| | | |
|---|---|---|
| JP | 2003037929 | 2/2003 |
| WO | WO98/27641 | 6/1998 |
| WO | WO 01/56133 A1 | 8/2001 |

\* cited by examiner

*Primary Examiner*—Bao Q. Vu
(74) *Attorney, Agent, or Firm*—Hamre, Schumann, Mueller and Larson, P.C.

(57) ABSTRACT

An electrical power supply system including an engine driven permanent magnet generator (11) operable to produce a variable voltage and high frequency output which is converted by a series train AC/AC conversion circuit (14) into a fixed voltage and relatively low frequency AC output for supply through a trip switch (56-58) to an external load (53-55). A bypass circuit including a pair of normally-closed parallel connected oppositely biased thyristors (66-68) is connected between the generator output and the output of the AC/AC conversion circuit (14).

24 Claims, 7 Drawing Sheets

ELECTRICAL POWER SUPPLY SYSTEM AND A PERMANENT MAGNET GENERATOR FOR SUCH A SYSTEM

CROSS-REFERENCES TO RELATED APPLICATIONS

This application is a National Stage of International Application PCT/GB2004/002062, filed May 13, 2004. Applicant claims foreign priority benefits under 35 U.S.C. 119(a)-(d) of the following foreign applications for patent: United Kingdom Application No. 0311013.7, filed May 13, 2003, which is hereby incorporated by reference in its entirety.

BACKGROUND OF THE INVENTION

This invention relates to an electrical power supply system including a source of AC power which is operable to provide an AC output voltage which has at least one phase, a series train AC/AC conversion circuit comprising first convertor means operable to establish an intermediate DC link by converting the AC output voltage into an intermediate DC voltage and second convertor means operable to convert the intermediate DC voltage into an AC output voltage having at least one phase for supply to an external load. Such an electrical power supply system is referred to in this description as an electrical power supply system of the kind referred to hereinbefore. More particularly, although not exclusively, this invention relates to an electrical power supply system of the kind referred to hereinbefore which may be an electrical power generating system and/or a motor starting system. This invention also relates to a permanent magnet generator operable to generate a variable voltage generator output, the generator being provided with rectifying means operable to rectify the variable voltage generator output.

WO 01/56133 discloses an electrical power supply system of the kind referred to hereinbefore which is an electrical power generating system and which also includes sensing means operable to monitor the intermediate DC link when the external load is connected across the AC power output and to provide a feedback signal to the speed control means whereby to effect a variation of the variable voltage generator output and thereby to counter a tendency of the intermediate DC voltage to vary. In order to provide the electrical power generating system disclosed by WO 01/56133 with protection from the consequences of a short circuit when the external load is connected across the AC power output, a trip switch would be provided in the, or each phase of the, AC power output, the or each trip switch being operable to disconnect the AC power output and the external load in response to short circuit conditions being sensed. The, or each, trip switch would be arranged to trip when current flow through it has been maintained at a certain level for a certain time.

Suitable trip switches have a current/time tripping characteristic which allows a high current flow for a short time, sufficient for starting a motor or switching on lamps, before they are tripped by the high current or they allow lower levels of current flow for longer periods of time before they are tripped. The short circuited load current is liable to build up to a high level if the trip switches are arranged to be tripped by a low operating current.

Naturally high frequency self commuted devices such as transistors and other electronic components of the system need to be rated to withstand the power to which the trip switches may be subjected without tripping. Accordingly, where the second convertor means comprise a transistor arrangement, as is usual, it is desirable for the transistors thereof to be rated so as to withstand a current several times greater than the current to which they are subjected under normal load operating conditions as such a higher than normal current is needed to trip the trip switches with minimal time delay in response to the sensing of short circuit conditions. This requirement imposes a significant cost penalty as the cost of a transistor increases significantly with its current rating. Similar trip switches may be employed in a motor starting system to provide the permanent magnet motor with overcurrent protection and the foregoing observations having regard to provision of trip switches in an electrical power generating system such as is disclosed by WO 01/56133 in order to provide protection from the consequences of a short circuit when the external load is connected across the AC power output apply to the use of such trip switches for overcurrent protection in a motor starting system.

U.S. Pat. No. 6,295,215 issued Sep. 25, 2001 to Faria et al. discloses an electrical power supply system of the kind referred to hereinbefore which is provided with a bypass circuit which connects the or each phase of the AC output voltage provided by the source of AC power directly to a respective phase of the AC output voltage of the second convertor means thereby bypassing the series train AC/AC conversion circuit, the bypass circuit including an electronically operable unidirectional switch arrangement for the or each phase of the AC output voltage provided by the source of AC power, the electronically operable unidirectional switch arrangement being operable to enable current flow through the bypass circuit as well as through the series train AC/AC conversion circuit when the power supply system is connected to an external load, the electrical power supply system also including current sensing means operable to sense current flow to the external load when the power supply system is connected to that load and control means responsive to the current sensing means and operable to control the unidirectional switch arrangement and thereby to control current flow through the bypass circuit. The electrical power supply system of the kind referred to hereinbefore disclosed in U.S. Pat. No. 6,295,215 is commonly used in equipment such as uninterrupted (or "uninteruptible") power supplies (UPSs), motor drives and other applications. In a first mode of operation of the electrical power supply system of the kind referred to hereinbefore disclosed by U.S. Pat. No. 6,295,215, the series train AC/AC conversion circuit may be operated such that it causes the bypass circuit to predominately transfer real power from the source of AC power to the external load, that real power being a second component of power from the source of AC power to the external load, the first component of power from the source of AC power to the external load being transferred by the series train AC/AC conversion circuit. In a second mode of operation, the series train AC/AC conversion circuit transfers power from the source of AC power to the external load while the electronically operable unidirectional switch arrangement of the bypass circuit is open so that no power is transferred from the source of AC power to the external load through the bypass circuit.

U.S. Patent Application, Publication No. 2003/0043521, discloses provision of a fuse between a power supply and a number of loads in parallel. The fuse is caused to be blown by a control circuit in response to sensed fault conditions. This is achieved by connecting the fuse to earth through a bypass circuit which bypasses the loads, the bypass circuit having a lower resistance so that the fuse blows.

An object of this invention is to enable the trip switch or switches provided either to protect an electrical power supply system of the kind referred to hereinbefore which is incorporated in an electrical power generating system from the consequences of a short circuit when the external load is connected across the AC power output or to provide a motor starting system with overcurrent protection, to be tripped with minimal delay after short circuit or overcurrent conditions are sensed whilst allowing low cost, low current rated electronic components to be used in the first and second convertors and in any sensing means of the electrical power supply system of the kind referred to hereinbefore.

According to one aspect of this invention there is provided an electrical power supply system including a source of AC power which is operable to provide an AC output voltage which has at least one phase, a series train AC/AC conversion circuit comprising first convertor means operable to establish an intermediate DC link by converting the AC output voltage into an intermediate DC voltage and second convertor means operable to convert the intermediate DC voltage into an AC output voltage having at least one phase for supply to an external load, a bypass circuit which connects the or each phase of the AC output voltage provided by said source directly to a respective phase of the AC output voltage of the second convertor means thereby bypassing the series train AC/AC conversion circuit, the bypass circuit including an electronically operable unidirectional switch arrangement for the or each phase of the AC output voltage provided by said source, the electronically operable unidirectional switch arrangement being operable to enable current flow through the bypass circuit as well as through the series train AC/AC conversion circuit when the power supply system is connected to an external load, current sensing means operable to sense output current flow from the series train AC/AC conversion circuit when the power supply system is connected to said load and control means responsive to said current sensing means and operable to control said unidirectional switch arrangement and thereby to control current flow through said bypass circuit, wherein a respective trip switch is provided for the or each phase of the AC output voltage of the second convertor means and the respective phase of the bypass circuit, the unidirectional switch arrangement being open normally so that normally there is no current flow through the bypass circuit but the control means being operable to close the unidirectional switch arrangement in response to the current sensing means sensing current flow through the series train AC/AC conversion circuit in excess of a predetermined current for a predetermined time so that the flow of current from the series train AC/AC conversion circuit to the external load through the trip switch or switches is augmented by the current flow through the bypass circuit whereby the or each trip switch is caused to trip by the augmented current flow through it.

According to another aspect of this invention there is provided a permanent magnet generator including two sets of star-connected multi-phase stator windings, each of the stator windings of each of the two sets being connected between diodes of a respective branch of a respective multi-phase diode rectifier arrangement which has a positive and a negative output, the positive outputs of each of the rectifier arrangements being for connection to the positive input of the first convertor means of an electrical power generating system according to said one aspect of this invention, the negative outputs of each of the rectifier arrangements being for connection to the negative input of said first convertor means and the common terminal of the two sets of star-connected multi-phase windings being for connection to the neutral of electrical power generating system.

Provision in an electrical power supply system of the kind referred to hereinbefore of a bypass circuit in accordance with said one aspect of this invention renders a permanent magnet generator arrangement according to the other aspect of this invention particularly useful as the source of AC power of the electrical supply system of the kind referred to hereinbefore.

In the preferred embodiment of this invention the electronically operable unidirectional switch arrangement is formed of thyristors which have a much higher ability to carry high currents than do transistors. Triggering of the thyristors results in the load being supplied directly from the generator by a high current which causes tripping of the trip switches and thereby protects the components of the AC/AC conversion circuit. The generator provides a variable high frequency output voltage whereas the frequency of the output voltage of the AC/AC conversion circuit is relatively low. This results in the thyristors being commutated naturally by the generator output voltage. Short pulses of current are passed by the bypass circuit, bypassing the AC/AC conversion circuit when the thyristors are tripped and several such short current pulses are passed during one half cycle of the output voltage of the AC/AC conversion circuit. The bypass circuit may be arranged to produce a large number of current pulses for each half cycle of the output from the AC/AC conversion circuit and that leads to a high quality output voltage and current from the system. This may be achieved by providing a large number of bypasses, each with its own unidirectional switch arrangement. For example, each phase of the generator output voltage may be connected to each phase of the output of the AC/AC conversion circuit via its own bypass including its own unidirectional switch arrangement. Such an arrangement is not only suitable for providing short circuit protection but it is also suitable for providing current overload protection in a motor starting system.

An electric power supply system according to one embodiment of the present invention comprises a source of AC power which is operable to provide an AC output voltage, a series train AC/AC conversion circuit including a first converter operable to establish an intermediate DC link, a bypass circuit connecting the AC output voltage provided by the source to a second converter for bypassing the series train AC/AC conversion circuit, a current sensor operable to sense output current flow from the series train AC/AC conversion circuit and a control unit responsive to the current sensor and operable to control a unidirectional switch arrangement and thereby to control current flow through the bypass circuit. Further, a trip switch is provided for an AC output voltage of the second converter and the bypass circuit wherein the unidirectional switch arrangement is normally open so that normally there is no current flow through the bypass circuit, the control unit being operable to close the unidirectional switch arrangement.

Several forms of electrical power supply systems in which this invention is embodied will be described now by way of example with reference to the accompanying drawings.

DETAILED DESCRIPTION OF THE INVENTION

Figure 1:
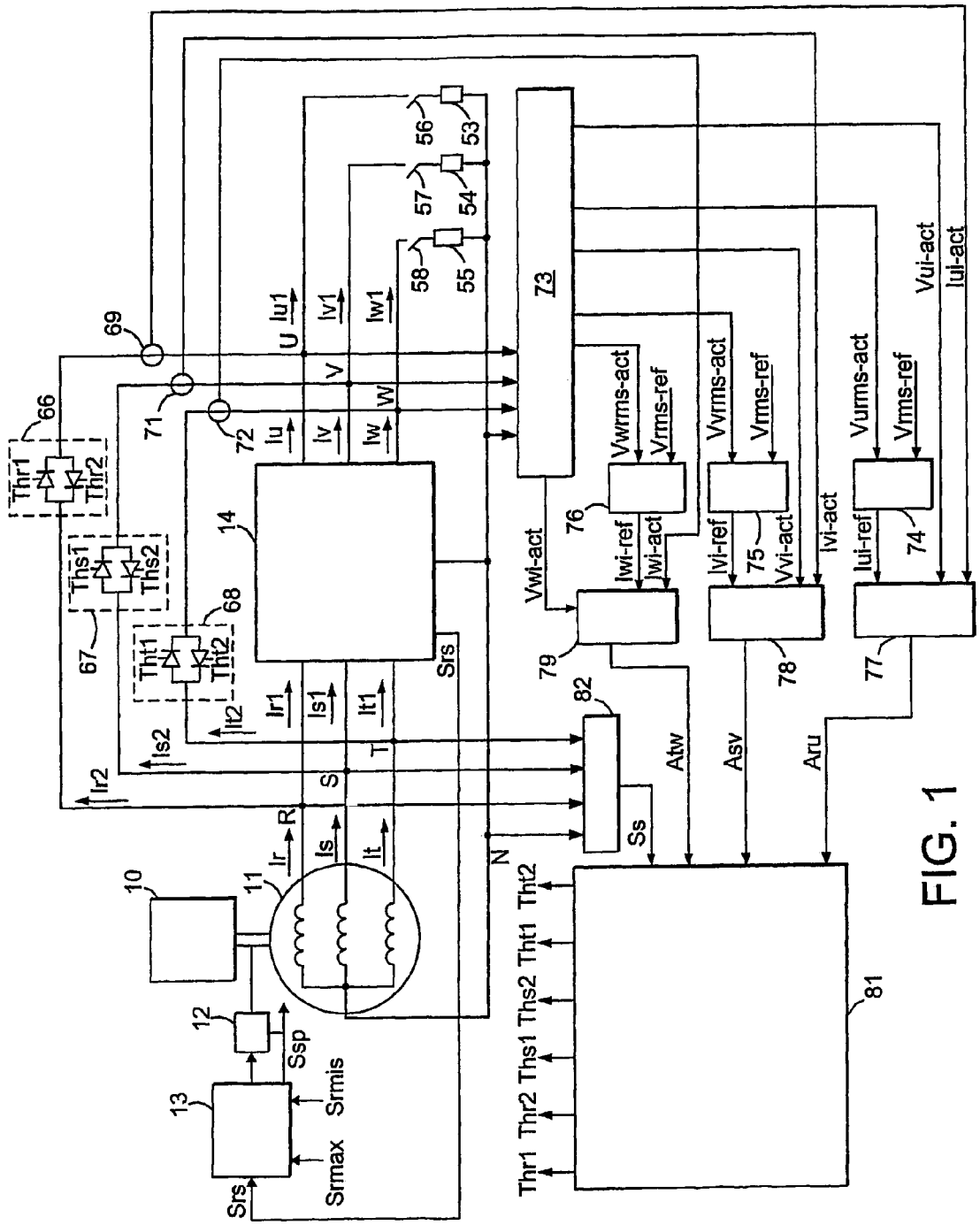
FIG. 1 is a diagrammatic representation of one form of electrical power generating system, according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows components of an electrical power generating set in diagrammatic form. The generating set includes a prime mover 10, such as a diesel engine, mechanically coupled with a rotor of an electric power generator whereby to rotate the rotor relative to a stator of the generator 11 and thereby to generate a three phase variable frequency and voltage AC output from the generator 11. The preferred form of electric power generator 11 is a permanent magnet generator.

The prime mover 10 has an electronic speed sensor 12, a speed controller 13 and an electronically controlled fuel injection system. The speed sensor 12 produces an output signal Ssp which is indicative of the sensed prime mover speed. The speed controller 13 has four input ports. One of those input ports receives a minimum speed reference signal Srmis. Another of those input ports receives the actual speed signal Ssp which is emitted by the speed sensor 12. A third of the input ports of the speed controller 13 receives a maximum speed reference signal Srmax and the fourth input port receives a speed correction signal Srs which is generated by operation of the generating set as is described below. The speed controller 13 controls operation of the fuel injection system of the prime mover 10 in response to the four input signals Ssp, Srs, Srmis and Srmax in order to control the prime mover 10 and to maintain the speed of the prime mover 10 between the minimum and maximum speeds and at a level which is related to the speed correction signal Srs.

Figure 2:
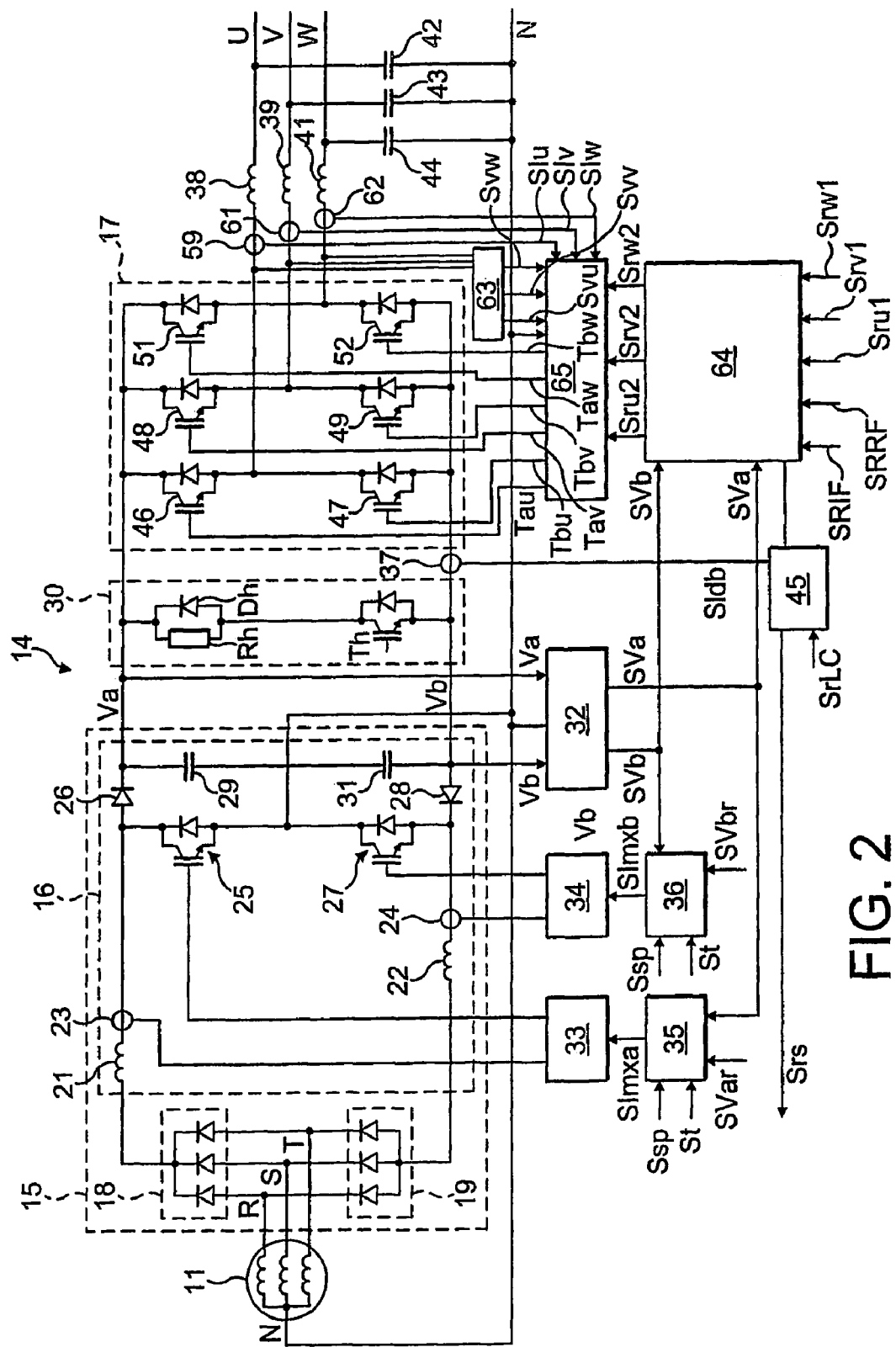
FIG. 2 is a diagrammatic representation of the AC/AC conversion circuit of the electrical power generating system shown in FIG. 1.

The three phase variable frequency and voltage output R, S, T of the generator 11 is connected to a series train AC/AC conversion circuit 14. FIG. 2 shows that the series train AC/AC conversion circuit 14 comprises a first converter 15, which is a twin rectifier circuit and a twin voltage booster circuit 16, a brake controller 30 and a second converter 17 which is a three phase DC/AC inverter. The twin rectifier circuit comprises a common cathode three pulse rectifier 18 and a common anode three pulse rectifier 19. The output R, S, T of the generator 11 is connected in parallel to the anodes of the common cathode three pulse rectifier 18 and to the cathodes of the common anode three pulse rectifier 19 and is rectified by each of the two rectifiers 18 and 19. Each of the rectifiers 18 and 19 has an output terminal. The output terminal that is connected to the cathodes of the rectifier 18 is positive and the output terminal that is connected to the anodes of the rectifier 19 is negative. The generator 11 has a neutral terminal N.

Each booster circuit part of the twin voltage booster circuit 16 is connected between a respective one of the output terminals of the rectifiers 18 and 19 and the neutral terminal N, conveniently via a filter which is not shown. Each booster circuit part includes an inductor 21, 22 which is connected in series between the output of the respective rectifier 18, 19 and one side of a respective current sensor 23, 24. The other side of the current sensor 23 is connected to the collector of a transistor 25 and to the anode of a diode 26.

The other side of the current sensor 24 is connected to the emitter of a transistor 27. The emitter of the transistor 25 and the collector of the transistor 27 are both connected to the neutral terminal N. The other side of the current sensor 24 is also connected to the cathode of a diode 28. The cathode of the diode 26 is connected to one side of a capacitor 29. The anode of the diode 28 is connected to one side of another capacitor 31. The other side of each of the capacitors 29 and 31 is connected to the neutral terminal.

The voltage across the capacitor 29 is boosted by the combined effect of the inductor 21 and the switching action of the parallel connected transistor 25 and the series connected diode 26. The voltage across the capacitor 31 is boosted by the combined effect of the inductor 22 and the switching action of the parallel connected transistor 27 and the series connected diode 28. The output of the twin booster circuit 16 is the voltage across the capacitors 29 and 31 and the sum of those voltages is maintained constant and forms the DC link voltage.

The brake controller 30 is connected across the DC link voltage. The brake controller 30 includes a resistor Rh in series with a transistor Th, the resistor Rh being connected to the collector of the transistor Th. A reverse biased diode Dh is connected in parallel with the resistor Rh. The base of the transistor Th is connected to a brake voltage controller which is not shown.

A voltage sensor 32 is connected across the capacitor 29 and thereby is operable to monitor the voltage Va across that capacitor 29. Further the voltage sensor 32 is also connected across the capacitor 31 and thereby is operable to monitor the voltage Vb across that capacitor 31. Hence the voltage sensor 32 is operable to monitor the DC link voltage. The voltage sensor 32 emits two output signals SVa and SVb which are respectively an indication of the voltage across the capacitor 29 and the capacitor 31.

The output of each current sensor 23, 24 is connected to an input of a respective current controller 33, 34 which provides a pulse width modulated drive to the base of the respective booster transistor 25, 27 which sources a controlled current to maintain the voltage Va, Vb across the respective capacitor 29, 31 constant as regulated by a respective voltage controller 35, 36.

Each of the voltage controllers 35 and 36 has four input ports and receives at one of those input ports the respective one of the output signals SVa and SVb emitted by the voltage sensor 32. Each voltage controller 35, 36 receives a respective reference signal SVar, SVbr at another of its input ports. The output signal Ssp from the speed sensor 12 is fed to a third of the input ports of each voltage controller 35, 36 and a reference signal St is fed to the fourth input port. The reference St is the maximum permitted current. It translates to a limiting speed for a given steady state power demand since current is varied by varying the speed of the prime mover 10. The reference St is chosen as being the current that flows when the prime mover 10 is operated at a certain working speed which is between the selected maximum and minimum engine speeds Srmax and Srmis and when a load is connected across the intermediate DC voltage. Each voltage controller 35,36 has one output which emits the respective current demand signal SImxa, SImxb which is fed to an input of the respective current controller 33,34.

The second converter 17 has a positive input which is connected to the cathode of the diode 26 and to one side of the capacitor 29 and a negative input which is connected through a third current sensor 37 to the anode of the diode 28 and to one side of the capacitor 31. The second converter 17 has a power output terminal U, V, W for each phase which is for connection to an external load. The output of each phase U,V,W is connected through a respective filter circuit comprising a respective series connected inductor 38, 39, 41 and capacitor 42, 43, 44 to the neutral terminal.

The third current sensor 37 measures current flow between the twin booster circuit 16 and the second converter 17. The current sensor 37 emits a signal Sldb which is fed to one of three inputs of a speed correction circuit 45. Another input of the speed correction circuit 45 receives a reference signal SrLC and the output of the speed correction circuit 45 is the signal Srs that is fed to the speed controller 13.

The AC power output for each phase U, V, W of the three-phase output of the second converter 17 is produced by operation as bistable switching means of a respective one of three pairs of transistors 46 and 47; 48 and 49; 51 and 52 which are connected in parallel with one another and with the pair of capacitors 29 and 31. The series connection between the transistors of each pair 46 and 47, 48 and 49, 51 and 52 is connected to the respective power output terminal U, V, W through the respective inductor 38, 39, 41. These power output terminals U, V, W are the power output terminals of the AC/AC conversion circuit 14 shown in FIG. 1.

Figure 3:
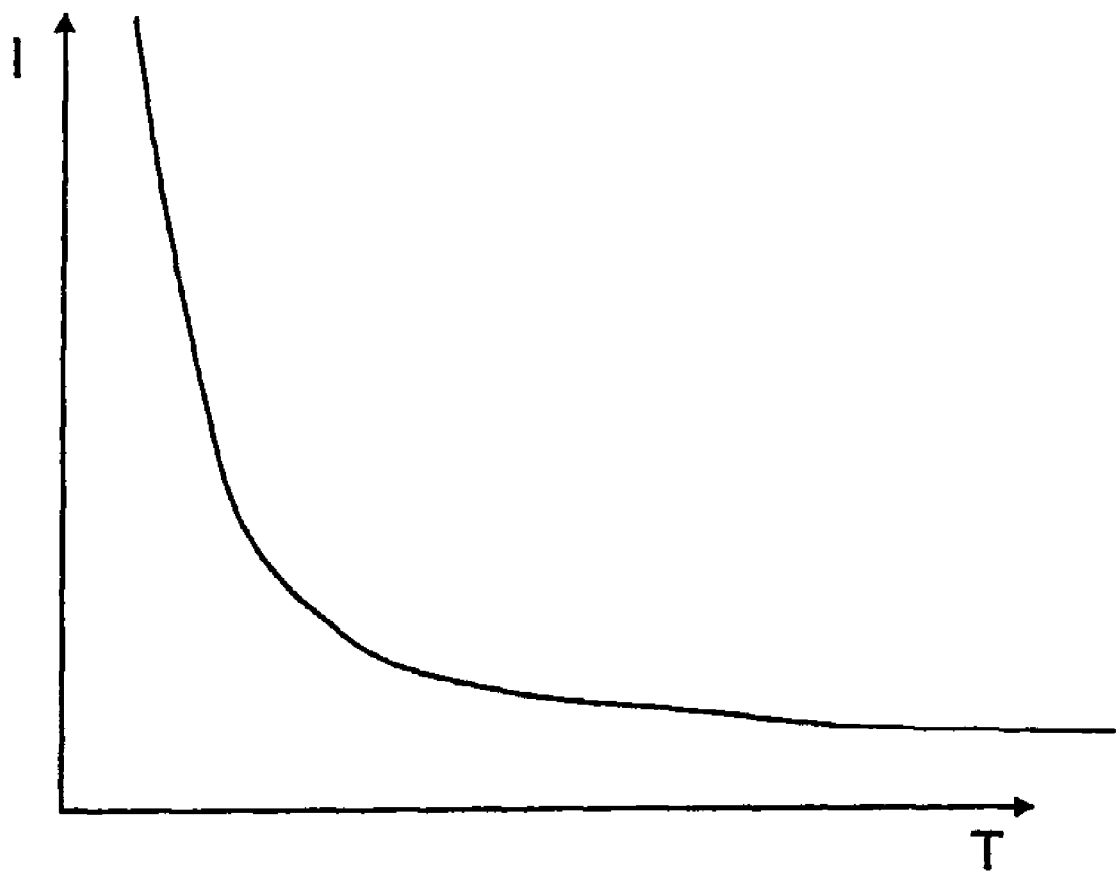
FIG. 3 is a graph of current against time and is an illustration of the tripping characteristics of each of the trip switches of the system illustrated in FIG. 1.

When each power output U, V, W of the AC/AC conversion circuit 14 is connected to an external load 53, 54, 55, a trip switch 56, 57, 58 is connected between the respective power output U,V,W and the neutral line N of the system through the respective load 53, 54, 55, each trip switch 56-58 having one pole connected to the respective power output U, V, W and another pole connected to the respective load 53-55. Another current sensor 59, 61, 62 for each phase (see FIG. 2) is connected between the respective power output U, V, W and the respective trip switch 56, 57, 58 on either one side (as shown) or the other of the respective inductor 38, 39, 41 to measure the current flow through that inductor 38, 39, 41. A voltage sensor 63 senses the output voltage between each line that is connected to each power output terminal U, V, W and the neutral N. Each trip switch 56, 57, 58 is arranged to trip and disconnect the respective load 53, 54, 55 when current flow in that line is at a certain level for a certain time. The curve shown in FIG. 3 is a plot of the current values and elapsed time at which a trip switch 56-58 trips.

The reference levels for the required values of output frequency and voltage produced by normal operation of the generating set are provided by an amplitude and frequency correction circuit 64 (see FIG. 2) which has seven inputs and three outputs. It receives the output signals SVa and SVb from the voltage sensor 32 that indicate the voltages across the capacitors 29 and 31 which together comprise the DC link voltage, at respective ones of the inputs. At the remaining five inputs it receives respective reference signals SRIF, SRRF, Sru1, Srv1 and Srw1. Three outputs Sru2, Srv2 and Srw2 from the voltage, amplitude and frequency correction circuit 64 are fed to respective ones of three inputs of an inverter controller 65. The inverter controller 65 has another input which is connected to the neutral line N. It also receives three input signals Svu, Svv and Svw from the voltage sensor 63 and three input signals SIu, SIv, SIw from the respective current sensor 59, 61, 62 that measures the current flow through the respective inductor 38, 39, 41. The inverter controller 65 controls the switching operation of the transistors 46, 47, 48, 49, 51 and 52 of the three pairs of transistors of the inverter 17 by emitting a respective pulse-width modulation signal from a respective output Tau, Thu, Tav, Tbv, Taw, Tbw which is connected to the base of the respective transistor 46, 47, 48, 49, 51, 52. As a result, the AC output U, V, W of each phase has a substantially fixed frequency and voltage and it is that substantially fixed frequency and voltage AC output which normally is supplied to the respective load 53-55 through the respective trip switch 56-58.

Each phase of the variable frequency and voltage AC output of the generator 11 is connected through a respective switch arrangement 66, 67, 68 to a respective one of the three power outputs U, V, W of the AC/AC conversion circuit 14. Each switch arrangement 66, 67, 68 comprises a parallel connected pair of electronically operated unidirectional switches Thr1 and Thr2, Ths1 and Ths2, and Tht1 and Tht2. Each electronically operated unidirectional switch Thr1, Thr2, Ths1, Ths2, Tht1, Tht2 is a thyristor. The switches Thr1 and Thr2, Ths1 and Ths2, Tht1 and Tht2 of each pair are biased in the opposite directions so that, when turned on, one of them Thr1, Ths1, Tht1 transmits the respective phase of the three phase output of the generator 11 when that phase is positive whilst the other switch of the parallel connected pair, Thr2, Ths2, Tht2 transmits the respective phase when that phase is negative.

The unidirectional switches Thr1-Tht2 are connected to the control means of the generating set which is adapted to turn each of them on and off. In one embodiment of this invention, each unidirectional switch Thr1-Tht2 is connected to a respective output of the inverter controller 65 which receives the input signals SIu, SIv and SIw from the respective current sensors 59, 61 and 62 which measure current flow from the AC/AC conversion circuit 14 to the respective load 53-55, the inverter controller 65 being adapted to emit a firing signal which triggers each of the unidirectional switches Thr1-Tht2 from its off state to on.

During normal operation of the system, the unidirectional switches Thr1-Tht2 are in their turned off state so that there is no current flow through them to the power output U, V, W. In the event that the current sensors 59, 61 and 62 sense that current has flown through any one of the outputs U, V, W at a certain level for a certain time commensurate with a short circuit or with overcurrent conditions in a motor starting system and that there is a need to trip the respective trip switches 56-58, the inverter controller 65 effects turning on of the unidirectional switches Thr1-Tht2 and speeding up of the generator 11 by way of a suitable connection between the inverter controller 65 and the third input of the speed correction circuit 45. This leads to an increase in the generator output. That output is fed directly to the power output U, V, W through the respective switches Thr1-Tht2 so that a significantly higher current is fed to those outputs bypassing the AC/AC conversion circuit 14 and instantly effecting tripping of the trip switches 56, 57 and 58. The frequency of the AC output of the generator 11 is significantly higher than the frequency of the 3-phase output U, V, W of the AC/AC conversion circuit 14, say of the order of twice as high. Accordingly, the generator output voltage changes from positive to negative during a half cycle of the output voltage at the terminals U, V, W. As a result, the unidirectional switches Thr1-Tht2 will be turned off naturally when the generator output voltage falls below the output voltage of the AC/AC conversion circuit 14 and when the current through the respective unidirectional switch Thr1-Tht2 falls to zero.

However, in the preferred embodiment of this invention that is illustrated in FIGS. 1-3, provision is made for synchronising triggering of the unidirectional switches Thr1-Tht2 from their off states to on with the substantially fixed frequency of the output of the AC/AC conversion circuit 14 and with the variable frequency of the output of the generator 11, the latter frequency being of the order of twice that of the former.

Accordingly, a further current sensor 69, 71, 72 for each phase (see FIG. 1) is connected between the respective switch arrangement 66, 67, 68 and the respective power output U,V,W of the A/C conversion circuit 14. Each current sensor 69, 71, 72 produces an actual current signal Iui-act, Ivi-act, Iwi-act which is indicative of current flow in the respective phase of the bypass circuit through the switching arrangements 66-68.

FIG. 1 includes a diagrammatic illustration of a system for controlling switching on of the thyristors Thr1, Thr2, Ths1, Ths2, Tht1, Tht2 of the switch arrangements 66-68 to provide the synchronisation referred to above. This control system includes an integrated voltage sensor 73 which senses the output voltage between each line that is connected to each power output terminal U, V, W and the neutral N. The sensor 73 shown in FIG. 1 preferably is the same sensor as the voltage sensor 63 shown in FIG. 2 but it could be another sensor. Either way, the sensor 73 is operable to emit an actual voltage output signal Vui-act, Vvi-act, Vwi-act for each phase and an rmns output voltage signal Vurms-act, Vvrms-act, Vwrms-act for each phase.

There are three rms voltage regulators 74, 75, 76, one for each phase. Each rms voltage sensor 74, 75, 76 receives the respective rms output voltage signal Vurms-act, Vvrms-act, Vwrms-act at one input from the integrated voltage sensor 73 and a reference rms voltage signal Vrms-ref at another input. Each rms voltage regulator 74, 75, 76 produces a respective reference current signal Iui-act, Ivi-act, Iwi-act at its output. Normally each actual rms output voltage signal Vurms-act, Vvrms-act, Vwrms-act is greater in magnitude than the reference rms voltage signal Vrms-ref in which case the respective output reference current signal Iui-ref, Ivi-ref, Iwi-ref is zero. However, when current flow in the respective power output line U, V, W of the AC/AC conversion circuit rises to a certain level for a certain time commensurate with a short circuit or with overcurrent conditions in a permanent magnet motor driving system so that there will be a need to cause the respective trip switch 56, 57, 58 to trip and disconnect the respective load, the respective actual rms output voltage signal Vurms-act, Vvrms-act, Vwrms-act will be reduced to below the reference rms voltage signal Vrms-ref in which case the respective output reference current signal Iui-ref, Ivi-ref, Iwi-ref will be a sinusoidal signal with an amplitude which is greater than zero.

There are three current regulators 77, 78, 79, one for each phase. Each current regulator or 77, 78, 79 has three inputs and one output. Each current regulator 77, 78, 79 receives the respective actual voltage output signal Vui-act, Vvi-act, Vwi-act at one input from the integrated voltage sensor 73, the respective reference current signal Iui-ref, Ivi-ref, Iwi-ref at another input from the respective rms voltage regulator 74, 75, 76 and the actual current signal Iui-act, Ivi-act, Iwi-act from the respective current sensor 69, 71, 72. Each current regulator 77, 78, 79 produces a respective reference signal Aru, Asv, Atw at its output when the amplitude of the respective sinusoidal reference current signal Iui-ref, Ivi-ref, Iwi-ref is greater than zero. The respective reference signal Aru, Asv, Atw that is emitted from each current regulator 77,78,79 when the respective trip switch 56, 57, 58 has been tripped, is known as an angle signal. The respective reference signal Aru, Asv, Atw is positive when the respective actual voltage output signal Vui-act, Vvi-act, Vwi-act is positive and is negative when the respective actual voltage output signal Vui-act, Vvi-act, Vwi-act is negative.

Each reference signal Aru, Asv, Atw is fed to a thyristor firing controller 81. A synchronisation unit 82 has four inputs and one output. Each of the four inputs of the synchronisation unit 82 is connected to a respective one of the power outputs R, S, T and to the neutral N of the generator 11. The output of the synchronisation unit 82 is indicative of the instantaneous electrical angle of each phase R, S, T of the output voltage and is connected to a fourth input of the thyristor firing controller 81.

The thyristor firing controller 81 transforms each angle signal Aru, Asv, Atw it receives into a respective thyristor firing signal and controls those thyristor firing signals in relation to the electrical angle of the respective phase R, S, T of the generator output voltage. When each angle signal Aru, Asv, Atw is positive, the respective thyristor firing signal is directed to trigger the respective thyristor Thr1, Ths1, Tht1 of the respective phase R, S, T of the generator output. When each angle signal Aru, Asv, Atw is negative, the respective thyristor firing signal is directed to trigger the other respective thyristor Thr2, Ths2, Tht2 of the respective phase R, S, T.

Each angle signal Aru, Asv, Atw determines the electrical angular position in the respective cycle at which the respective thyristor Thr1-Tht2 is to be triggered from its off-state to on. It will be appreciated that logic devices could be used to determine to which thyristor Thr1-Tht2 each thyristor firing signal is directed to trigger that thyristor Thr1-Tht2 from its off state to on when the sinusoidal output voltage Vui-act, Vvi-act, Vwi-act is positive and when it is negative.

Hence, whenever the respective phase of the power output of the AC/AC conversion circuit 14 is positive, as it will be for about 10 msecs., and the amplitude of the respective output reference current signal Iui-ref, Ivi-ref, Iwi-ref is greater than zero, the thyristor Thr1, Ths1, Tht1 that transmits the generator output current when it is positive will be triggered repeatedly so that a plurality of positive pulses of generator output current will be transmitted through the respective switch arrangement 66-68 to the output U, V, W for the duration of a positive half cycle of the power output of the AC/AC conversion circuit 14. Further, provision can be made to synchronise the timing of triggering of the thyristors Thr1-Tht2 with the sinusoidal form of the generator output current and with that of the output of the AC/AC conversion circuit 14 so as to maximise the number of pulses of generator output current that are fed through the respective bypass circuit switch arrangement 66-68 during one half cycle of the output current of the AC/AC conversion circuit 14.

It is not essential for an electrical power generating system which includes an asynchronous bypass circuit with high current unidirectional switches such as thyristors for short circuit or current overload protection as has been described above with reference to FIGS. 1 to 3, to include the neutral line N as shown in FIG. 1. The principle of operation of the bypass in such a system would be similar to that that has been described with reference to FIGS. 1 to 3.

Figure 4:
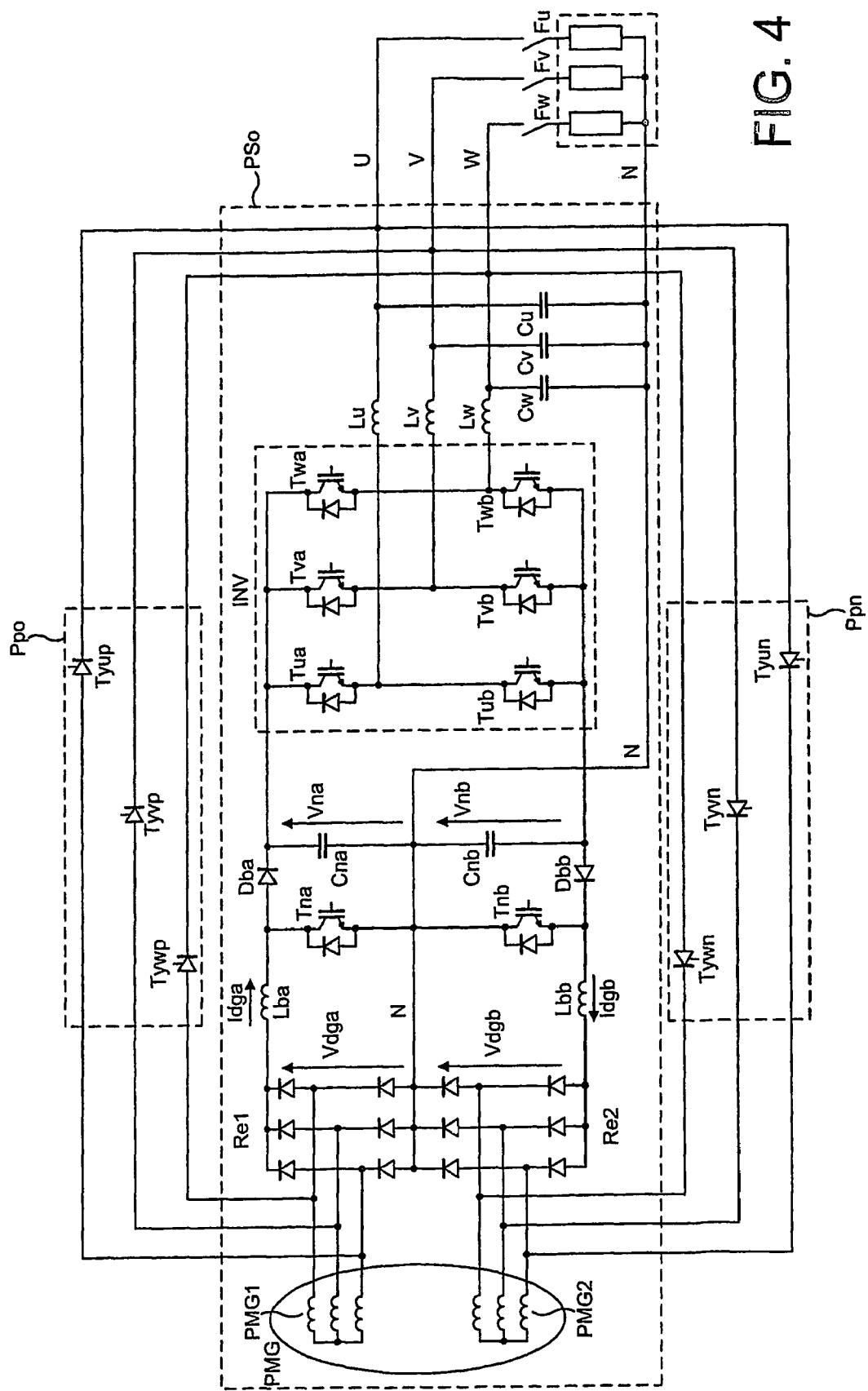
FIG. 4 is a diagrammatic representation of another form of electrical power generating system, according to another embodiment of the present invention.

FIG. 4 shows a system which differs from that described above with reference to FIGS. 1 to 3 in the detailed arrangement of the generator, the rectifiers and the electronically operated unidirectional switches. The diagrammatic illustration of the system for controlling switching of the thyristors is omitted for convenience. The generator PMG shown in FIG. 4 is a permanent magnet generator which has two three phase variable frequency and voltage outputs PMG1 and PMG2. Each of the two three phase variable frequency and voltage outputs PMG1 and PMG2 is rectified by a respective one of two full wave bridge rectifiers Re1 and Re2. Each bridge rectifier Re1, Re2 has a connection to a neutral terminal and has a power output terminal which, with respect to the neutral, is positive in the case of the bridge rectifier Re1 and negative in the case of the bridge rectifier Re2. The neutral N of the AC power output of the generating set shown in FIG. 4 is connected to the common neutral terminal of the two bridge rectifiers Re1 and Re2 instead of being connected to the neutral terminal of the generator 11 as was described above and illustrated in FIGS. 1 and 2.

Each phase of the three phase AC output from the three phase generator windings PMG1 is connected through a respective electronically operated unidirectional switch Tyup, Tyvp, Tywp which is a thyristor, to a respective one of the three power outputs U, V and W of the system. Likewise each phase of the three phase AC output from the three phase generator windings PMG2 is connected through a respective electronically operated unidirectional switch Tyun, Tyvn, Tywn, which again is a thyristor, to a respective one of the three power outputs U, V and W of the system. The three switches Tyup, Tyvp, Tywp are biassed to transmit the respective phase of the three phase output from the generator windings PMG1 when that phase is positive and the other three switches Tyun, Tyvn and Tywn are oppositely biassed so as to transmit the respective phase of the three phase output from the generator windings PMG2 when that phase is negative. Again, the unidirectional switches Tyup-Tywn are connected to the control means of the system which is adapted to trigger each of them from their off state to on by an appropriate thyristor firing signal. The system described above with reference to and as illustrated in FIG. 4 otherwise operates in a similar manner to that described above with reference to FIGS. 1 to 3.

Figure 5:
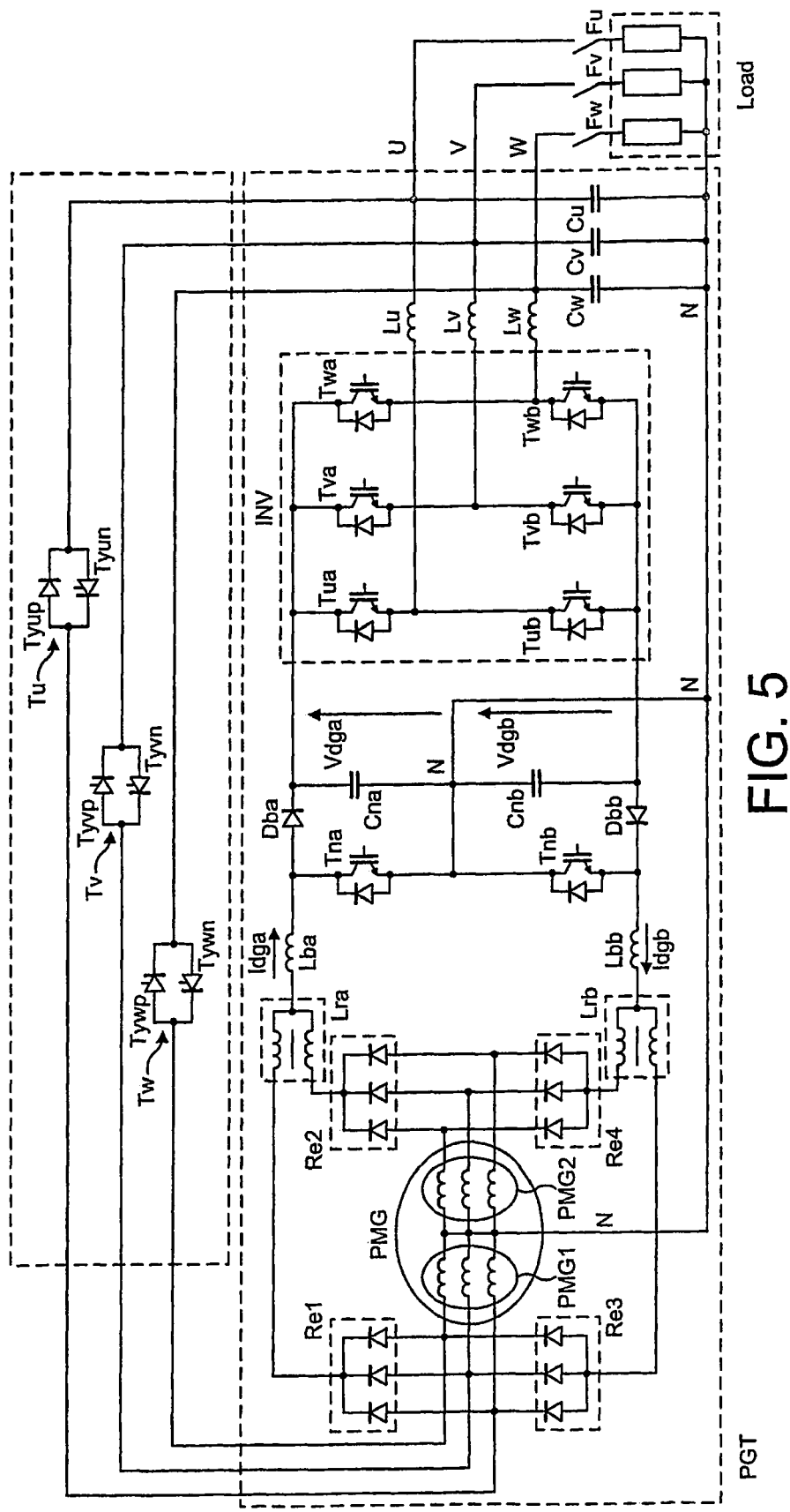
FIG. 5 is a diagrammatic representation of a further form of electrical power generating system, according to another embodiment of the present invention.

FIG. 5 shows another modification of the system described above with reference to and as illustrated in FIGS. 1 and 2 in which the three phase generator 11 and the rectifiers 18 and 19 of the system shown in FIGS. 1 and 2 are replaced by a different topology of permanent magnet generator and rectifiers Re1, Re2, Re3 and Re4.

The permanent magnet generator PMG shown in FIG. 5 has a star connected double three phase stator winding PMG1 and PMG2. The common terminal of the star connected double three phase stator windings PMG1 and PMG2 is connected to a neutral line N. Each of the other ends of the double three phase stator windings PMG1 and PMG2 is connected between a respective anode of a common cathode three pulse rectifier Re1, Re2 and a respective cathode of a common anode three pulse rectifier Re3, Re4. The common cathode of each of the three pulse rectifiers Re1 and Re2 is connected through a respective one of a pair of coupled inductors Lra to the inductor Lba of the positive line of the booster circuits of the system. Each of the common anodes of the three pulse rectifiers Re3 and Re4 is connected through a respective one of two coupled inductors Lrb to the inductor Lbb of the negative line of the booster circuits of the system. The coupled inductors Lra assure parallel operation of the common cathode three pulse rectifiers Re1 and Re2. Likewise the coupled inductors Lrb assure parallel operation of the common anode three pulse rectifiers Re3 and Re4. Thus a difference between the DC output rectified voltages from the respective pair of common cathode three pulse rectifiers Re1 and Re2 is reduced by the coupled inductors Lra and a difference between the DC output rectified voltages from the respective pair of common anode three pulse rectifiers Re3 and Re4 is reduced by the respective coupled inductors Lrb. As a result, the DC output connected to the inductor Lba, Lbb of the respective positive or negative line supplying the booster circuits of the system has the characteristics of the output of a six pulse rectifier.

The three windings PMG1 of the star connected double three phase stator windings of the permanent magnet generator PMG, that are connected between the common cathode three pulse rectifier Re1 and the common anode three pulse rectifier Re3 are also each connected through a respective one of the electronically operated switch arrangements Tu, Tv, Tw to a respective one of the three power outputs U, V, W of the system. Operation of the system is otherwise as described above with reference to and as illustrated in FIGS. 1 to 3.

Figure 6:
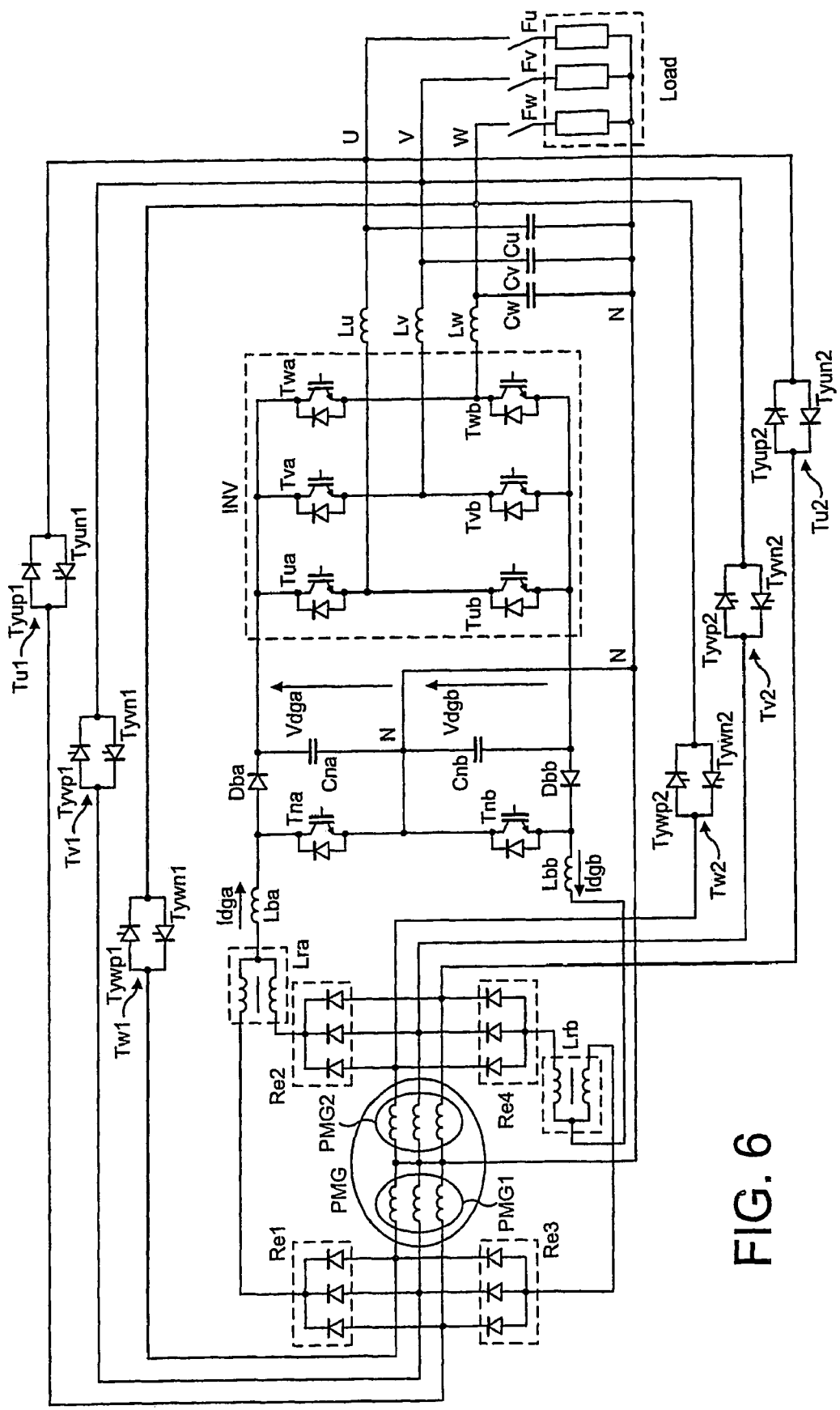
FIG. 6 is a diagrammatic representation of yet another form of electrical power generating system, according to another embodiment of the present invention.

FIG. 6 shows a system that is similar to the system described above with reference to and as illustrated in FIG. 5. The difference is that each of the three windings of the other group of star connected three phase stator windings PMG2 of the permanent magnet generator PMG that are connected between the common cathode three pulse rectifier Re2 and the common anode three pulse rectifier Re4 are also connected to a respective one of the three power output terminals U, V, W through a respective switch Tu2, Tv2 and Tw2. Each of the switches Tu2, Tv2 and Tw2 comprises a parallel connected pair of oppositely biased unidirectional switches, Tyup2 and Tyun2; Tyvp2 and Tyvn2; and Tywp2 and Tywn2, those switches being thyristors. The operation of the system shown in FIG. 6 will be understood from the foregoing description.

Figure 7:
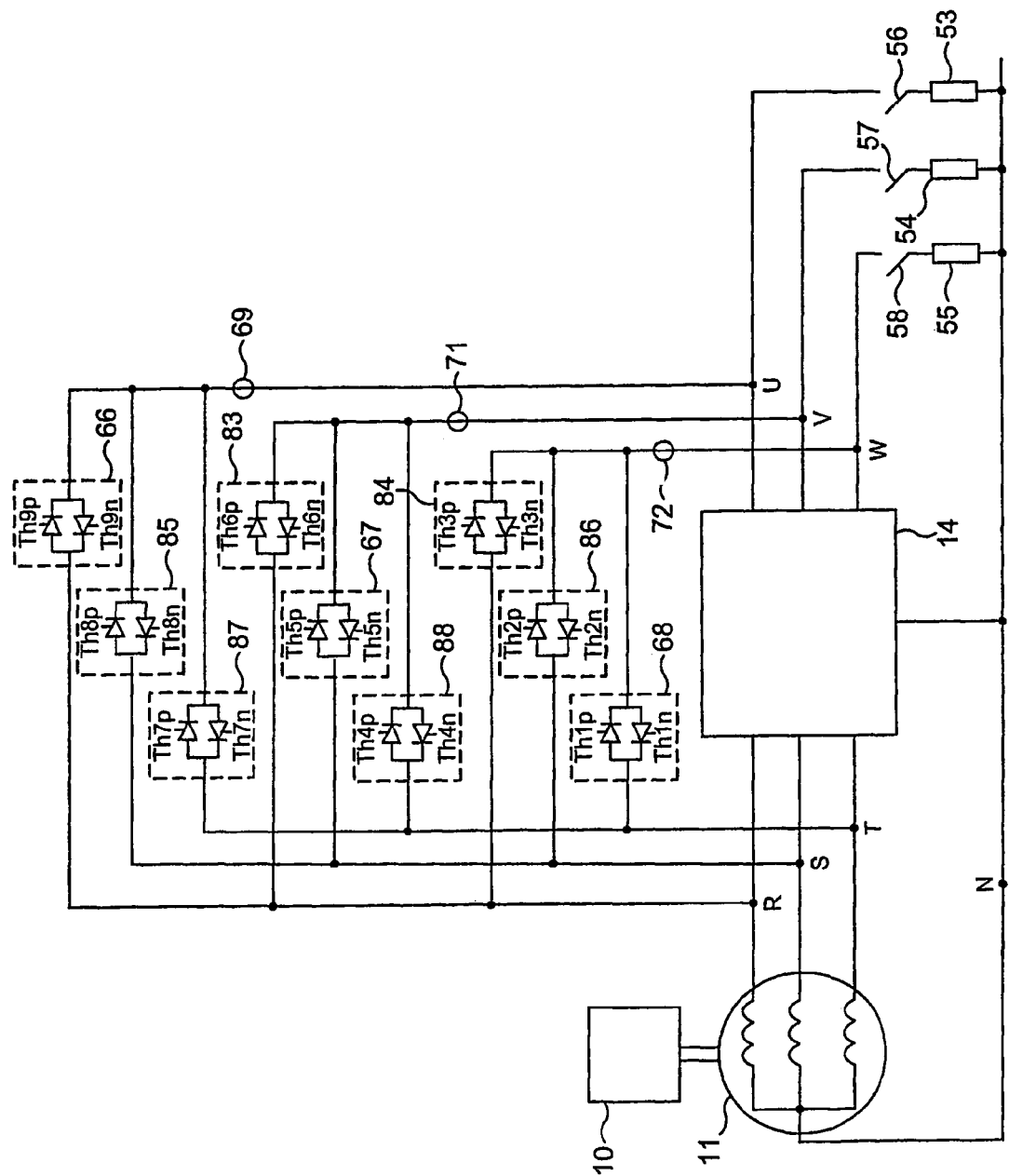
FIG. 7 is a diagrammatic representation of another form of electrical power generating system, according to another embodiment of the present invention.

FIG. 7 shows a modified form of asynchronous bypass circuit for use in the electrical power generating system described above with reference to FIGS. 1 to 3 which renders it particularly suitable for use as a motor starting system. Parts of the system shown in FIG. 7 that correspond to like parts of the system shown in FIG. 1 are identified by the same reference character. By this modification, each phase R, S, T of the variable voltage and high frequency output of the generator 11 is connected to each phase U, V, W of the relatively low fixed frequency output of the AC/AC conversion circuit 14 through a respective switch arrangement. More specifically, in addition to being connected to the output phase U by the switch arrangement 66, the generator output phase R is connected to the output phase V by a switch arrangement 83 and to the output phase W by a switch arrangement 84. Also, in addition to being connected to the output phase V by the switch arrangement 67, the generator output phase S is connected to the output phase U by a switch arrangement 85 and to the output phase W by a switch arrangement 86. Further, in addition to being connected to the output phase W by the switch arrangement 68, the generator output phase T is connected to the output phase U by a switch arrangement 87 and to the output phase V by a switch arrangement 88.

In the event that the current sensors 59, 61 and 62 sense that current has flown through any one of the outputs U, V, W at a certain level for a certain time commensurate with a short circuit or with overcurrent conditions in a motor starting system and that there is a need to trip the respective trip switches 66,83,84 or 67,85,86 or 68,87,88, a control system constructed according to the principles described above with reference to FIG. 1 will control triggering of those groups of three switches so that three times as many pulses of current are fed one after another through each bypass circuit to the respective phase U, V, W of the output of the AC/AC conversion circuit 14 during each half cycle of the latter than is the case with the arrangement described above with reference to FIG. 1, with the result that high quality voltage and current suitable for starting a motor will be supplied.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An electric power supply system comprising:
a source of AC power which is operable to provide an AC output voltage;
a series train AC/AC conversion circuit comprising a first converter operable to establish an intermediate DC link by converting the AC output voltage into an intermediate DC voltage and a second converter operable to convert the intermediate DC voltage into an AC output voltage for supply to an external load;
a bypass circuit which connects the AC output voltage provided by said source directly to the AC output voltage of the second converter thereby bypassing the series train AC/AC conversion circuit, the bypass circuit including an electronically operable unidirectional switch arrangement for the AC output voltage provided by said source, the electronically operable unidirectional switch arrangement being operable to enable current flow through the bypass circuit as well as through the series train AC/AC conversion circuit when the power supply system is connected to an external load;
a current sensor operable to sense output current flow from the series train AC/AC conversion circuit when the power supply system is connected to said load; and
a control unit responsive to said current sensor and operable to control said unidirectional switch arrangement and thereby to control current flow through said bypass circuit, wherein a trip switch is provided for the AC output voltage of said second converter and said bypass circuit, said unidirectional switch arrangement being open normally so that normally there is no current flow through said bypass circuit and said control unit being operable to close said unidirectional switch arrangement in response to said current sensor sensing current flow through said series train AC/AC conversion circuit in excess of a predetermined current for a predetermined time so that the flow of current from said series train AC/AC conversion circuit to said external load through said trip switch is augmented by current flow through said bypass circuit whereby the switch is caused to trip by the augmented current flow through it.

2. An electrical power supply system according to claim 1, wherein said source of AC power includes a generator operable to generate said AC output voltage.

3. An electrical power supply system according to claim 2, wherein said generator is operable to generate a variable voltage generator output as said AC output voltage of said source of AC power, said source of AC power also including a variable speed prime mover drivingly coupled with the generator and a speed controller operable to control the speed of the prime mover and said electrical power supply system further including a sensor operable to monitor the intermediate DC link when the external load is connected across the AC power output and to provide a feedback signal to the speed controller whereby to effect a variation of the variable voltage generator output and thereby to counter a tendency of the intermediate DC voltage to vary.

4. An electrical power supply system according to claim 1, which is a motor starting system, wherein the AC output voltage of the second converter is connected to a stator winding of the permanent magnet motor.

5. An electrical power supply system according to claim 1, wherein the electronically operable unidirectional switch of the arrangement is a thyristor.

6. An electrical power supply system according to claim 3 wherein the variable voltage generator output is a multiphase output.

7. An electrical power supply system according to claim 6, wherein at least one phase of the variable voltage generator output is connected to a positive input of the first converter and another phase of the variable voltage generator output is connected to a negative input of the first converter.

8. An electrical power supply system according to claim 5, wherein the bypass circuit includes a pair of oppositely biased thyristors which are connected in parallel to the respective phase of the AC output voltage of the second converter.

9. An electrical power supply system according to claim 8, wherein each phase of the generator output is connected to the respective phase of the AC output voltage of the second converter by the bypass circuit through a respective pair of oppositely biased thyristors.

10. An electrical power supply system according to claim 8, wherein each phase of the multiphase variable voltage generator output is connected to the respective phase of the AC output voltage of the second converter by the bypass circuit through a respective thyristor.

11. An electrical power supply system according to claim 10, wherein each thyristor by which said phases of the variable voltage generator output are connected to the respective phase of the output of said second converter are oppositely biased to each thyristor by which said other phases are connected to the respective phase of said output of the second converter.

12. An electrical power supply system according to claim 5, wherein each thyristor is turned off during normal operation of the system and is turned on by operation of said control unit when current flow through said series train AC/AC conversion circuit in excess of a predetermined current for a predetermined time is sensed.

13. An electrical power supply system according to claim 12, wherein said control unit is operable to activate said speed controller to speed up the prime mover when current flow through said series train AC/AC conversion circuit in excess of a predetermined current for a predetermined time is sensed.

14. An electrical power supply system according to claim 7, wherein said first converter includes one full wave rectifier to which one phase of the variable voltage generator output is connected and another full wave rectifier to which another phase of the variable voltage generator output is connected, each of the two full wave rectifiers having a terminal which is connected to neutral.

15. An electrical power supply system according to claim 2, wherein the permanent magnet generator includes two sets of star-connected multi-phase stator windings, each of the stator windings of each of the two sets being connected between diodes of a respective branch of a respective multi-phase diode rectifier arrangement which has a positive and a negative output, the positive outputs of the rectifier arrangements being connected to the positive input of the first converter, the negative outputs of the rectifier arrangements being connected to the negative input of said first converter and the common terminal of the two sets of star-connected multi-phase windings being connected to neutral.

16. An electrical power supply system according to claim 14, wherein each of the positive and negative outputs of the rectifier arrangements is connected to the respective input of the first converter through a respective multi-coupled winding inductance arrangement.

17. An electrical power supply system according to claim 1, wherein said control unit is operable to synchronize closing of said unidirectional switch arrangement for each phase of the AC output voltage provided by said source with the frequency of the respective AC output voltage provided by said source and with the frequency of the respective phase of the AC output voltage of the second converter.

18. An electrical power supply system according to claim 17, in which the frequency of the AC output voltage provided by said source is higher than the frequency of the AC output voltage of the second converter and said control unit is adapted to control closure of said unidirectional switch arrangement for each phase such that, during one positive half cycle of the respective phase of the AC output voltage of said second converter, a series of positive current pulses are fed from said source to the respective phase of the AC output of said second converter via the respective unidirectional switch arrangement.

19. An electrical power supply system according to claim 18, wherein said control unit is operable to monitor the rms value of each phase of the AC output voltage of said second converter and to trigger switching on of the unidirectional switch arrangement of the respective bypass circuit for that phase when that rms voltage value is less than a certain reference value.

20. An electrical power supply system according to claim 17, wherein each phase of the AC output voltage provided by said source is connected to each phase of the AC output voltage of said second converter through a respective bypass circuit having its own unidirectional switch arrangement.

21. An electrical power supply system according to claim 20, wherein said control unit is operable to control triggering of each unidirectional switch arrangement so that pulses of current are fed from said source to the AC output of said second converter through each unidirectional switch arrangement, one after another.

22. An electrical power supply system according to claim 1, said source of AC power comprising a permanent magnet generator including two sets of star-connected multi-phase stator windings, each of the stator windings of each of the two sets being connected between diodes of a respective branch of a respective multi-phase diode rectifier arrangement which has a positive and a negative output, the positive outputs of each of the rectifier arrangements being connected to the positive input of said first converter, the negative outputs of each of the rectifier arrangements being connected to the negative input of said first converter, and the common terminal of the two sets of star-connected multi-phase windings being connected to the neutral of the electrical power generating system.

23. An electric power supply system according to claim 22 wherein each of the positive and negative outputs of the rectifier arrangements is connected to the respective input of the first converter through a respective multi-coupled winding inductance arrangement.

24. An electric power supply system comprising:
a source of AC power which is operable to provide an AC output voltage which has at least one phase;
a series train AC/AC conversion circuit comprising first converter means operable to establish an intermediate DC link by converting the AC output voltage into an intermediate DC voltage and second converter means operable to convert the intermediate DC voltage into an AC output voltage having at least one phase for supply to an external load;
a bypass circuit which connects the, or each phase of the, AC output voltage provided by said source directly to a respective phase of the AC output voltage of the second converter means thereby bypassing the series train AC/AC conversion circuit, the bypass circuit including an electronically operable unidirectional switch arrangement for the, or each phase of the, AC output voltage provided by said source, the electronically operable unidirectional switch arrangement being operable to enable current flow through the bypass circuit as well as through the series train AC/AC conversion circuit when the power supply system is connected to an external load;
current sensing means operable to sense output current flow from the series train AC/AC conversion circuit when the power supply system is connected to said load; and
control means responsive to said current sensing means and operable to control said unidirectional switch arrangement and thereby to control current flow through said bypass circuit, wherein a respective trip switch is provided for the, or each phase of the, AC output voltage of said second converter means and the respective phase of said bypass circuit, said unidirectional switch arrangement being open normally so that normally there is no current flow through said bypass circuit but said control means being operable to close said unidirectional switch arrangement in response to said current sensing means sensing current flow through said series train AC/AC conversion circuit in excess of a predetermined current for a predetermined time so that the flow of current from said series train AC/AC conversion circuit to said external load through said trip switch or switches is augmented by current flow through said bypass circuit whereby the, or each, trip switch is caused to trip by the augmented current flow through it.

* * * * *